United States Patent [19]

Šulc et al.

[11] Patent Number: 4,806,287

[45] Date of Patent: Feb. 21, 1989

[54] METHOD FOR POLYMERIZATION CAST MOLDING OF LENSES FROM HYDROPHILIC GELS

[75] Inventors: Jiří Šulc; Zuzana Krcová; Jiří Vacík, all of Praha, Czechoslovakia

[73] Assignee: Ceskoslovenska akademie ved, Czechoslovakia

[21] Appl. No.: 22,074

[22] Filed: Mar. 5, 1987

[30] Foreign Application Priority Data

Mar. 5, 1986 [CS] Czechoslovakia .................. 1505-86

[51] Int. Cl.$^4$ ............................................. B29D 11/00
[52] U.S. Cl. ....................................... 264/1.1; 264/2.1; 264/2.2; 264/313; 264/337; 425/808
[58] Field of Search ............... 425/808; 264/1.1, 2.2, 264/2.1, 313, 337

[56] References Cited

U.S. PATENT DOCUMENTS

| | | | |
|---|---|---|---|
| 2,290,917 | 7/1942 | Smith | 425/808 |
| 3,361,858 | 1/1968 | Wichterle | 425/808 |
| 3,380,718 | 4/1968 | Neefe | 425/808 |
| 4,208,364 | 6/1980 | Shepherd | 264/2.2 |
| 4,347,198 | 8/1982 | Ohkada et al. | 425/808 |

FOREIGN PATENT DOCUMENTS

| | | | |
|---|---|---|---|
| 1193422 | 11/1959 | France | 264/1.1 |
| 620317 | 3/1949 | United Kingdom | 425/808 |

Primary Examiner—James Lowe
Attorney, Agent, or Firm—Leydig, Voit & Mayer

[57] ABSTRACT

A method and apparatus for the polymerization cast molding of lenses from hydrophilic gels. A hydrophobic liquid which is essentially immiscible with a hydrophilic polymerization mixture is introduced into a mold having a hydrophobic surface, followed by dosing of the hydrophilic monomer mixture which is allowed to polymerize to form a drop which is pressed, while polymerizing, into the mold with a punch having a hydrophobic molding surface. The polymerizing monomer mixture is maintained under the pressure of the punch until the end of the polymerization. Any overflow of the two liquids is allowed to escape between the mold and the punch. The apparatus comprises a concave mold with an inner hydrophobic, rotation-symmetrical surface, and a punch with a hydrophobic molding surface which when placed in relationship to the mold has an overflow space formed between the mold and the punch.

2 Claims, 1 Drawing Sheet

METHOD FOR POLYMERIZATION CAST MOLDING OF LENSES FROM HYDROPHILIC GELS

BACKGROUND OF THE INVENTION

The invention pertains to a method and equipment for the polymerization cast molding of articles, above all of lenses from hydrophilic gels.

In the processes hitherto known, the molded articles from hydrogels, above all soft contact lenses, are made by polymerization casting in molds. The volume is reduced under a steep increase of viscosity during polymerization. This contraction gives rise to bubbles and surface depressions in firm molds. The formation of bubbles is prevented in open rotating molds by a free level on the one hand and by the centrifugal force of rotation on the other. However, the apparatuses for polymerization casting of lenses under rotation are rather complicated and have high demands to precision. A certain amount of rejects should be always considered in the industrial production and the articles must be classified on the basis of precise measurements.

Rods and tubes from hydrogels, above all in a nonswollen state, can be produced by the polymerization of a monomer mixtures in elastic molds, for example, in hoses from silicon rubber. Only semiproducts are obtained in this way, which are processed to the required articles by precise mechanical working. The direct cast molding of articles is not concerned in this case.

SUMMARY OF THE INVENTION

It has been found, that the molded aticles, above all lenses from hydrophilic gels, may be produced by the polymerization cast method according to the invention, where hydrophobic liquid, which is immiscible with a hydrophilic monomer mixture, is introduced in a mold with hydrophobic surface, then the hydrophilic monomer mixture is dosed into the mold and allowed to polymerize, while the formed drop of polymerizing mixture is pressed into the mold by a punch having a chosen hydrophobic molding face, the polymerizing mixture is maintained under the pressure of punch until the polymerization is completed, and the contingent overrun polymerization mixture and/or the hydrophobic liquid is allowed to escape between the mold and the punch.

BRIEF DESCRIPTION OF THE DRAWINGS

The invention is further illustrated in detail in appended drawings and the examples of performance.

DETAILED DESCRIPTION OF THE PREFERRED EMBODIMENTS

Figure 1:
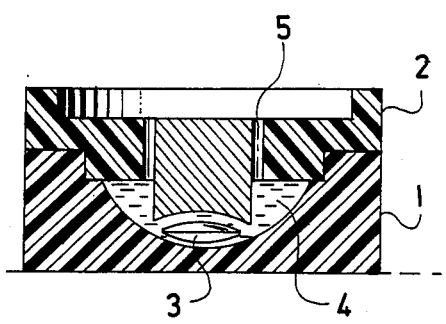
FIG. 1 shows a longitudinal section of the closed equipment.

Provided that some component of the hydrophilic monomer mixture, for eaxmple, a crosslinking agent or initiator, is partially soluble in the hydrophobic liquid, a change in the composition of monomer mixture can be prevented by the previous saturation of the hydrophobic liquid with the said component to equilibrium.

An equipment for performing the method according to the invention consists of a mold with the inner hydrophobic surface which is rotation symmetrical and a punch, the molding hydrophobic surface of which is concave or convex, whereas an overflow space is provided between the punch and the mold. The overflow space may be formed in such a way, that the punch is furnished with channels or the overflow space is demarcated by elastic projections of the punch and/or the mold. The overflow space enables the hydrophobic liquid and/or the hydrophilic polymerizing mixture to run over.

The edge of punch and the corresponding part of the mold surface are advantageously shaped in such a way that the prepared article has channels on its circumference, which enable circulation of liquid.

The mold may be either stationary or rotating. The shape of inner surface may be moderately modified by insertion of a cylindric insert in order to compensate the astigmatic defeat of eye, if it is desired.

The punch presses the polymerization mixture gradually, while a continuous or discontinuous space, which enables the overflow, is allowed between the punch and the mold until the end of polymerization.

The polymerization thus proceeds under a certain pressure of main part with exception of the contingent overflow and the volume contraction during polymerization is compensated in this way.

If the rotating mold is used, the rotation influences only formation of the circumference of lens and not the shape of its main central part. The central part is given by the shape of mold and punch. Lenses with all dioptric values, either positive or negative, can be obtained by varying these shapes. In addition to contact lenses, also intracameral lenses may be produced by this method.

The monomer mixture may, but need not contain a crosslinking agent. If it is absent, an additional crosslinking of the obtained swollen hydrogel article may be achieved by the reaction of side groups of the polymer with a suitable bifunctional agent, e.g. by the reaction of side amide groups with formaldehyde in the presence of diluted mineral acid, and the like.

If the monomer mixture contains water, water-soluble initiators of radical polymerization can be employed, for example, ammonium or potassium persulfate, if need be, in the combination with a suitable reducing agent (e.g. hydrogen sulfite) and a small amount of ions of copper or iron. Such initiator is not transferred into the hydrophobic phase.

The monomer mixture comprises, in addition to the polymerization initiator, monomer or monomers, which mixture is at least in part miscible with water, and possibly a solvent, also aqueous solutions of suitable salts, e.g. zinc chloride, lithium bromide, sodium thiocyanate, magnesium perchlorate, and the like.

Saturated aliphatic hydrocarbons, for example, paraffin oils, silicon oils, or also mercury or low-melting metal alloys may serve as the hydrophobic liquid.

The hydrophilic monomer mixture may have the same, higher or lower density as the hydrophilic liquid.

Examples of the hydrophilic monomer are 2-hydroxyethyl methacrylate with addition of less than 1% of ethylene dimethyacrylate as a crosslinking agent, further acrylamide dissolved in water with the addition of N,N'-methylenebis(acrylamide), aqueous solution of methacrylamide with the addition of less than 1% of N,N'-methylenebis(acrylamide), aqueous solution of N-vinylpyrrolidone or N-vinyl-6-hexanelactam as such or with the addition of some of the above mentioned crosslinking agents, N-acrylamides, N-alkylmethyacrylamides, N-(hydroxyalkyl)acrylamides, and N-(hydroxyalkyl)methacrylamides, and others.

Besides the above mentioned persulfates, also other usual compounds may be used as radical initiators, as hydrogen peroxide and sulfur dioxide, 2,2'-azobis-(isobutyronitrile), peroxodcarbonates, and others. The polymerization may be induced also by the known radiation methods, e.g. by irradition with ultraviolet light using sensitizers of the benzoin type. Initiators which are better soluble in the hydrophilic monomer mixture than in the hydrophobic liquid are advantageously used. For the radiation-induced polymerization, it is necessary to use the molds and punches from quartz glass hydrophobized on the surface with silicon compounds.

The hydrophobic liquid, in which a drop of polymerizing hydrophilic liquid freely flows, has an important role in the procedure according to the invention. The hydrophilic monomer mixture assumes a spherical shape in it provided that both liquids have the same density. If the polymerizing mixture has a higher density than the hydrophobic liquid, the drop of polymerizing hydrophilic mixture is more or less flattened, depending from the density difference of both liquids. Because the surfaces of mold and punch are hydrophobic or artificially hydrophobized, for example, with the compounds of silicon series, the polymerizing hydrophilic mixture cannot adher to these surfaces and freely moves on them with a minimum friction. This is of great importance in order to prevent from the formation of bubbles or surface depressions as a consequence of the contraction during polymerization. Another advantage consists in the fact that the article freely falls out from the mold and need not be swelled off in advance as in the case of the polymerization casting without hydrophobic liquid. Besides this, the hydrophobic liquid protects the polymerization mixture from transferring the vibrations which sometimes occur in the equipment, so that the molding is completely smooth. As a consequence of the fact that the polymerizing mixture is not in the direct contact with the mold and punch, but that it may freely slip on a very thin layer of the hydrophobic liquid, various internal stresses and the resulting unevennesses of the formed polymer network are excluded. This favourably affects the mechanical properties of article.

Addition of a solvent into the monomer mixture, up to values where the separation of phases occurs and transparency is lost, is advantageous because no stress is formed in the polymeric three-dimensional network during the subsequent postswelling with water to the equilibrium state which could lead to a decrease in strength and elasticity. The stress of polymeric network can be removed by the known way also by carrying out the polymerization in the presence of a hydrophilic liquid which swells the resulting crosslinked polymer more than it is swelled with water and a subsequent washing of this hydrophilic liquid, e.g. ethylene glycol diethyl ether or 2-hydroxyethyl acetate, with water. Partial deswelling occurs by replacing the above mentioned liquids with water, which results in contraction and relaxation of stretched linkages of the network.

The equipment according to the invention, the section of which is shown in FIG. 1, consists of a mold 1 and a punch 2, which is furnished with overflow channels 5 and a concave molding surface, which a hydrophilic mixture 3 and a hydrophobic liquid 4 are dosed into the space between the mold 1 and punch 2. The same equipment before polymerization, i.e. in the open state, is shown in FIG. 2.

Figure 2:
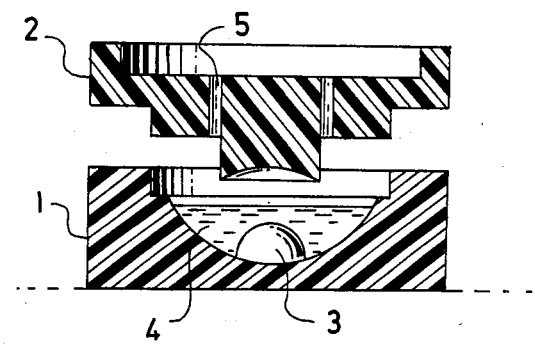
FIG. 2 shows a section of the open equipment where the molding surface of the punch is concave.

The equipment according to FIG. 1 and 2 serves for the production of converging lenses (lenses with the positive dioptric value) from the monomer mixture with a higher specific weight than has the hydrophobic liquid.

Figure 3:
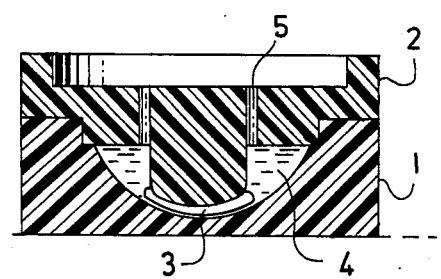
FIG. 3 shows a section of the closed equipment.
Figure 4:
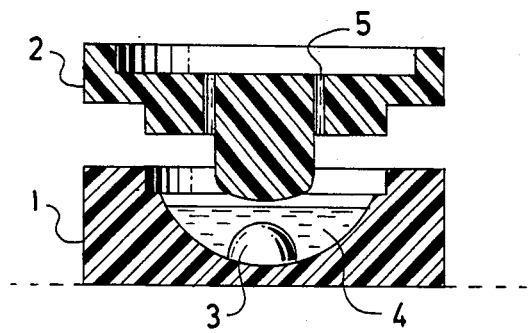
FIG. 4 a section of the open equipment, where the molding surface of punch is convex. The open equipment, which section is shown in FIG. 5, differs from the equipment in FIG. 3 and 4 in the punch which is furnished with a differently designed overflow space.

The analogous equipment is shown in FIG. 3 and 4, which differs in the convex molding surface of the punch. This equipment is determined for the production of diverging lenses.

Figure 5:
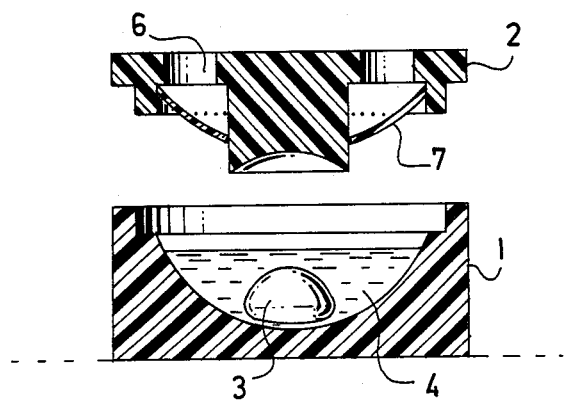
Figure 6:
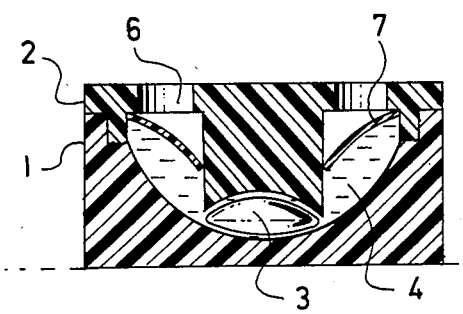
FIG. 6 shows a section through this equipment in the closed state.

In the open assembly before polymerization shown in FIG. 5, the mold 1 is provided with elastic projections and the punch 2 is furnished with an overflow space 6 and an elastic deformable edge 7. FIG. 6 shows the same assembly after closing for polymerization.

The mold and punch may be made, for example, from isotactic polypropylene, silicon rubber, hydrophobized silicate or quartz glass, or inert metal. The surfaces of mold and punch must be wetted with the hydrophobic liquid but not with the hydrophilic monomer mixture.

The overflow space between the punch and mold may be advantageously modified by providing the prepared contact lens with channels on its circumference which enable the passage and circulation of liquid (tears). This allows a sufficient supply of oxygen to the surface of cornea so that Sattler's fog does not occur even after long wearing periods. The circulation of tears is supported by the contingent known modification of contact lens with one or more openings. If the arrangement of the punch and mold is stationary, such opening or openings can be obtained by providing the punch and/or the mold with an elastic projection or projections, which pass through the whole thickness of casting.

The edge of punch is preferably elastically deformable to such extent, that the space between the punch and mold is not completely closed even at the medium thrust of the punch.

The punch may have the various diameter. Its central part, which is decisive for the optical properties, depends on the shape of punch and mold even when the rotating mold is employed in order to achieve thinner edge. If the molding part of punch is concave, the punch can be movable in the radial direction while the liquid rotating in mold is automatically centered.

EXAMPLE 1

The necessary amount of refined paraffin oil and a drop of a monomer mixture consisting of 2-hydroxyethyl methacrylate with 0.3% of ethylene glycol dimethyacrylate, 35% of water and 0.1% of azobis-(isobutyronitrile) are introduced into a polypropylene mold 1 (FIG. 1) with the spherical surface. The mold is closed with a shaped polypropylene punch 2 and heated under nitrogen for 4 hours at 60° C. The punch is furnished with slots on the circumference which enable overflow of oil, while the edge of punch does not bear tightly on the mold. The overrun monomer mixture creates a rounded edge. The mold is then opened and the lens freely falls out, is rinsed with petroleum, allowed to dry, and placed in water.

EXAMPLE 2

The procedure according to example 1 is repeated with the distinction that the equipment shown in FIG. 2 is used and the monomer mixture has the following composition: 50 wt. parts of methyacrylamide, 0.5 parts of methylene-bis-methacrylamide, 48.45 parts of water previously free of air oxygen, 0.6 parts of a 10% aqueous solution of ammonium persulfate, and 0.05 parts of a 1% aqueous solution of crystalline copper(II) sulfate. The polymerization is carried out under nitrogen at ambient temperature.

We claim:

1. A method for the polymerization cast molding of lenses from hydrophilic gels comprising introducing into a mold with a hydrophobic surface, a hydrophobic liquid which is immiscible with a hydrophilic monomer mixture, subsequently dosing into the mold the hydrophilic monomer mixture which forms a drop within the hydrophobic liquid, allowing the monomers as a drop within the hydrophobic liquid to polymerize while pressing the drop of polymerizing monomer mixture into a mold cavity with a punch which also has a hydrophobic molding surface, and maintaining the drop of polymerizing monomer mixture under the pressure from the punch until the polymerization is substantially complete, any overflow of the two liquids during the process being allowed to escape between the mold and the punch.

2. A method according to claim 1 wherein the hydrophobic liquid is saturated to equilibrium with a component of the monomer mixture which is partially soluble in the hydrophobic liquid, prior to introduction into the mold.

* * * * *